US008539772B2

(12) United States Patent
Hurtado

(10) Patent No.: US 8,539,772 B2
(45) Date of Patent: Sep. 24, 2013

(54) AIR CONDITIONING USING MECHANICAL LEVERAGE AND REFRIGERANTS

(76) Inventor: Arthur F. Hurtado, Riverside, CA (US)

(*) Notice: Subject to any disclaimer, the term of this patent is extended or adjusted under 35 U.S.C. 154(b) by 274 days.

(21) Appl. No.: 13/011,729

(22) Filed: Jan. 21, 2011

(65) Prior Publication Data

US 2011/0179788 A1 Jul. 28, 2011

Related U.S. Application Data

(60) Provisional application No. 61/336,465, filed on Jan. 25, 2010.

(51) Int. Cl.
*F03G 7/04* (2006.01)
*F03G 7/06* (2006.01)
*F01K 23/06* (2006.01)
*F25B 23/00* (2006.01)

(52) U.S. Cl.
USPC ............... 60/641.6; 60/670; 60/671; 62/467

(58) Field of Classification Search
USPC ............... 60/398, 641.6, 641.8, 641.11, 670, 60/671
See application file for complete search history.

(56) References Cited

U.S. PATENT DOCUMENTS

| 4,617,801 | A | | 10/1986 | Clark | |
|---|---|---|---|---|---|
| 4,691,515 | A | * | 9/1987 | Ehrig et al. | 60/526 |
| 4,747,271 | A | * | 5/1988 | Fischer | 60/670 |
| 4,779,427 | A | * | 10/1988 | Rowley et al. | 62/467 |
| 4,790,477 | A | * | 12/1988 | Forkin et al. | 237/2 B |
| 5,014,770 | A | | 5/1991 | Palmer | |
| 6,533,026 | B1 | * | 3/2003 | Noah | 165/48.2 |
| 2008/0163625 | A1 | | 7/2008 | O'Brien | |
| 2010/0107633 | A1 | | 5/2010 | Tsao | |

* cited by examiner

*Primary Examiner* — Thomas Denion
*Assistant Examiner* — Laert Dounis
(74) *Attorney, Agent, or Firm* — Cionca Law Group P.C.

(57) ABSTRACT

In one embodiment, a mechanical leverage system using refrigerants in conjunction with temperature differences found in the environment is utilized for air conditioning, energy generation and other applications. The mechanical leverage system provides a means for altering boiling point temperatures of refrigerants in which the system is enabled to absorb and expel heat within the temperature differentials found in the environment. The mechanical leverage system is capable of saving or generating energy.

29 Claims, 9 Drawing Sheets

US 8,539,772 B2

AIR CONDITIONING USING MECHANICAL LEVERAGE AND REFRIGERANTS

CROSS-REFERENCE TO RELATED APPLICATIONS

This application claims the benefit of U.S. Provisional Application No. 61/336,465, filed Jan. 25, 2010, which is hereby incorporated by reference to the extent that it is not conflicting with the present application.

BACKGROUND OF THE INVENTION

1. Field of the Invention

The present invention relates generally to air conditioning systems and particularly to air conditioning systems configured to use mechanical leverage in order to save or produce energy.

2. Description of the Related Art

Two-chamber conventional air conditioning systems using an evaporator, a condenser and a compressor to move refrigerant vapors from the evaporator to the condenser are well known. The problem is that these systems are high consumers of electrical energy, and therefore, economically less and less attractive as energy becomes more and more scarce and expensive.

Attempts were also made to design systems that would capture the heat in the attic or other forms of heat energy for the purpose of using it in air conditioning applications, pool heating, refrigeration applications and electrical energy generation. The problem with these systems is that they are difficult and expensive to build and overall inefficient.

Therefore, a new, inexpensive, versatile and more efficient energy saving system is needed to take advantage of the abundantly and freely available ambient heat energy, such as heat from the attic, and/or other forms of heat energy such as the renewable solar energy.

The problems and the associated solutions presented in this section could be or could have been pursued, but they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

In one embodiment, a mechanical leverage system using refrigerants in conjunction with temperature differences found in the environment is utilized for air conditioning. The mechanical leverage system provides a means for altering boiling point temperatures of refrigerants in which the system is enabled to absorb and expel heat within the temperature differentials found in the environment.

Suitable heat donors and receivers for this process to proceed are essential. This may be economically obtained through heat differences occurring naturally in our environment. Environmental temperature differences are usually ample in supply. For example, temperatures of 120 degrees F. may be readily obtained by utilizing heat from attic spaces and heat collecting devices such as solar panels and parabolic mirrors. Conversely, cooler ambient air temperatures are also readily obtainable. Hence, an advantage of the system is the ability to use ambient heat and/or solar energy collected from the environment to power an air conditioning installation and, thus, to save energy.

In another embodiment, a mechanical leverage system using refrigerants in conjunction with temperature differences found in the environment is used for collecting heat energy from the environment for the purpose of generating electricity. Thus, an advantage of the system is the ability to convert plentifully available ambient heat energy and/or solar energy into electrical energy.

In another embodiment, input of energy may be applied to augment the system, when necessary to supplement the amount of heat energy collected from the environment.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
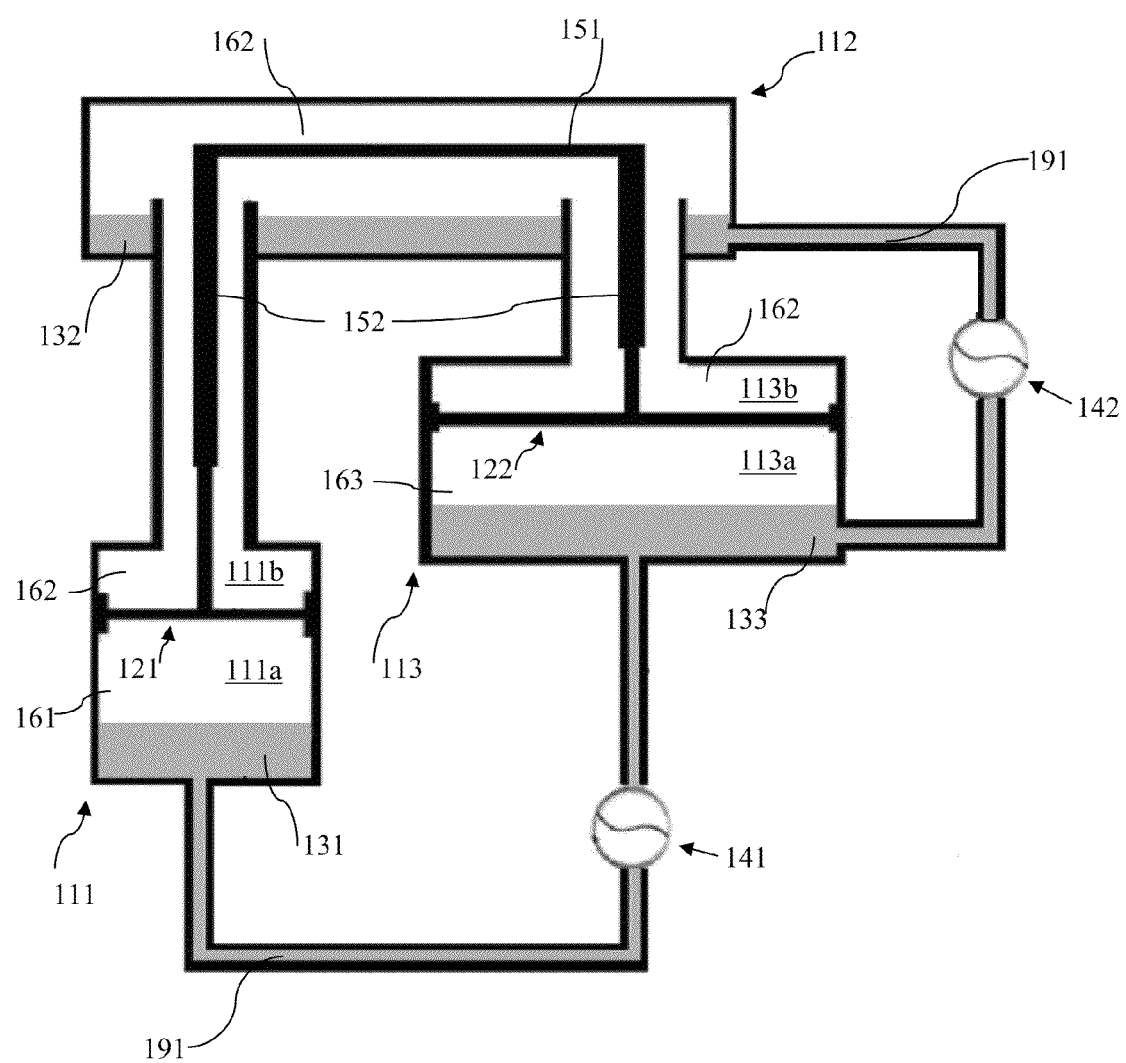
FIG. 1 illustrates a diagrammatic view of an air conditioning system, using mechanical leverage and refrigerant, according to one embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the present invention. Therefore, the scope of the present invention is defined by the accompanying claims and their equivalents.

FIG. 1 illustrates a diagrammatic view of an air conditioning system, using mechanical leverage and refrigerant, according to one embodiment. In general, refrigerants that are suitable for air conditioning consist of refrigerants having substantial latent heat of vaporizations and high vapor pressures with boiling points within the parameters of environmental temperatures. It is to be noted that, for exemplification purposes, in the systems depicted in FIG. 1 and in the subsequent figures the refrigerant used is ammonia (NH3).

The system in FIG. 1 comprises first chamber 111 containing first piston 121, which is configured to have the capability of moving hermetically inside first chamber 111. Hence, first chamber 111 is in effect also a cylinder for first piston 121. Thus, at various times in the system's cycle, first piston 121 effectively divides first chamber 111 into two sub-chambers 111a (first sub-chamber) and 111b (second sub-chamber). Similarly, second piston 122 divides third chamber 113 into sub-chambers 113a (third sub-chamber) and 113b (fourth sub-chamber). Sub-chamber 111a contains ammonia liquid 131 and ammonia vapor 161 at a pressure of 6.15 bars. Sub-chamber 111b contains ammonia vapor 162 at a pressure of 20.33 bars. Second Chamber 112 contains ammonia liquid 132 and ammonia vapor 162 at a pressure of 20.33 bars. Sub-chamber 113b contains ammonia vapor 162 at a pressure of 20.33 bars. Sub-chamber 113a contains ammonia liquid 133 and ammonia vapor 163 at a pressure of 15.54 bars.

It should be understood that the vertical configuration of the two pistons in FIG. 1 is used for illustration purposes only. Other configurations may be used (e.g. horizontal or inclined configurations) without departing from the scope of the invention.

Second sub-chamber 111b communicates with second chamber 112, which contains ammonia vapor 162 at a pressure of 20.33 bars. Next, second chamber 112 communicates with fourth sub-chamber 113b. Finally, third sub-chamber 113a, contains liquid ammonia 133 and ammonia vapors at a pressure of 15.54 bars, and it is configured to communicate controllably with first sub-chamber 111a and second chamber 112, with the aid of counter resistance 141 and pump 142, respectively. The counter resistance 141 may be a release valve, which may be used to release as needed some of the liquid ammonia 133 from third sub-chamber 113a into first sub-chamber 111a. The pump 142 may be used to pump as needed some of the liquid ammonia 133 from third sub-chamber 113a into second chamber 112.

First piston 121 and second piston 122 are communicated by a hydraulic system, comprising hydraulic members 152 and hydraulic hose 151, and are counter balanced against each other. The non-compressible fluid of the hydraulic system transfers pressure from one piston to the other making the actions of the pistons responsive to one another. Thus, it is ensured that, when the equilibrium is disturbed, the distance traveled by first piston 121 is equaled with the distance traveled by second piston 122. The pistons are mechanized by a push/pull action in that the energy from vaporization will push the first piston 121 and, conversely, the energy from condensation will pull the second piston 122.

The balancing of the two pistons is achieved by using a piston system, where second piston 122 has a larger surface area than first piston 121 in order to compensate for pressure differences. It is well established that:

(Difference in pressure 1)×Area 1=(Difference in pressure 2)×Area 2

From the above formula it may be deducted that in a leverage system, if the difference in vapor pressure acting on the first piston is larger than the difference of pressure acting on the second piston, then the surface area of the first piston is smaller than the surface area of the second piston. Furthermore, since the vapor pressure of refrigerants are proportional to temperature, the temperature differential associated with the first piston having the smaller surface area is greater than the temperature differential associated with the second piston having the larger surface area.

Again, for exemplification purposes, let's assume that first sub-chamber 111a contains liquid ammonia 131 at a pressure of 6.15 bars. The boiling point of ammonia at this pressure is 50 degrees Fahrenheit (F). Thus, at the temperature of 50 degrees F. or greater, the liquid ammonia 131 will boil filling with ammonia vapors 161 all available space delimited by the walls of first sub-chamber 111a and first piston 121. The second chamber 112 contains liquid ammonia 132 at a pressure of 20.33 bars. The boiling point of ammonia at this pressure is 122 degrees F. Thus, at the temperature of 122 degrees F. or greater, the liquid ammonia 132 will boil filling with ammonia vapors 162 all available space delimited by first piston 121, the walls of second sub-chamber 111b, the walls of second chamber 112, the walls of fourth sub-chamber 113b, and second piston 122. The third sub-chamber 113a contains liquid ammonia 133 and ammonia vapors 163 at a pressure of 15.54 bars. The boiling point of ammonia at this pressure is 104 degrees F. Thus, at the temperature of 104 degrees F. or lower, the ammonia vapors 163 in third sub-chamber 113a will condense joining the liquid ammonia 133.

To summarize, first sub-chamber 111a contains ammonia at a pressure of 6.15 bars and a temperature of 50 degrees F. At these parameters, one kilogram (kg) of ammonia vapor 161 occupies a volume of 0.2056 cubic meters. Second chamber 112 contains ammonia at a pressure of 20.33 bars and a temperature of 122 degrees F. At these parameters, one kilogram of ammonia vapor 162 occupies a volume of 0.0635 cubic meters. Finally, third sub-chamber 113a contains ammonia at a pressure of 15.54 bars and a temperature of 104 degrees F. At these parameters, one kilogram (kg) of ammonia vapor 163 occupies a volume of 0.0833 cubic meters.

At equilibrium the force exerted on piston 121 equals the force exerted on piston 122:

Force 1=Force 2

If F=P×A, or, F=ΔP×A, then:

$$(P2-P1) \times A1 = (P2-P3) \times A2; \quad \text{(Eq. 1)}$$

P1 is the pressure (6.15 bars) in first sub-chamber 111a; P2 is the pressure (20.33 bars) in second sub-chamber 111b, second chamber 112 and fourth sub-chamber 113b; P3 is the pressure (15.54 bars) in third sub-chamber 113a; A1 is the surface area of piston 121; A2 is the surface area of piston 122.

Then, if, for example, A1=1 sq.meter, then
(20.33−6.15) bars×1 sq.meter=(20.33-15.54) bars×A2, or:
14.18=4.79 (A2)
It results that, A2=2.96 sq.meters.
Since both pistons are interconnected, if first piston 121 travels 1 meter then second piston 122 also travels 1 meter. This means that:

Work 1=Work 2, or $$P1 \times V1 = P2 \times V2 \quad \text{(Eq. 2), or}$$

$$P1 \times A1 \times S1 = P2 \times A2 \times S2; \quad \text{(Eq. 3)}$$

S1=S2=1 meter; then,
14.18 bars×1 sq.meter×1 meter=4.79 bars×2.96 sq.meters×1 meter, or
14.18 bars×cubic.meter=14.18 bars×cubic.meter The ammonia in first sub-chamber 111a will boil and absorb heat from the room where it is placed. At 6.15 bars of vapor pressure, the temperature of the ammonia in first sub-chamber 111a is 50 degrees F. The ammonia at this temperature will adequately remove heat from a room where the temperature is greater than 50 degrees F. (for example, 75 degrees F.). As heat is removed from the room into first sub-chamber 111a, the ammonia within it will boil and will tend to equilibrate to the point of saturation. The resulting increase in ammonia vapor pressure (P1) in first sub-chamber 111a will translate into a pushing force exerted on first piston 121.

The second chamber 112 contains ammonia at a pressure of 20.33 bars (P2). Ammonia at this pressure requires a temperature of 122 degrees F. to boil. Heat may be acquired from ambient temperature of the attic, where second chamber 112 may be placed, and/or, from other sources, such as solar panels or reflectors, if needed. The boiling of the ammonia in second chamber 112 will result in an increase of the vapor pressure (P2), which will translate into a pushing force exerted on the first piston 121 and the second piston 122. The force exerted on second piston 122 is greater than the force exerted on first piston 121 due to the surface area of second piston 122 being greater than that of first piston 121. Hence, when, in second chamber 112, the pressure P2, which at system equilibrium is 20.33 bars, increases, the two pistons 121, 122 move clockwise (when looking at the exemplary system depicted in FIG. 1).

Third sub-chamber 113a contains ammonia at a pressure of 15.54 bars (P3) and a temperature of 104 degrees F. The ammonia vapor will condense by loosing heat to the cooler outside ambient air having a temperature of, for example, 95 degrees F. The condensation of the ammonia vapor in third sub-chamber 113a results in a decrease of vapor pressure, and thus, will have a pulling force effect exerted on second piston 122.

As explained later, the pressure/temperature difference between chamber 2 and third sub-chamber chamber 113a may be narrower with the use of the leverage system. The narrowing of this pressure/temperature difference makes it possible for the system to absorb heat and expel heat within the temperature ranges found in the environment. Thus, enabling the refrigerant in second chamber 112 to boil, and subsequently condense in sub-chamber 113a, at narrower pressure/temperature differences between attic and outside ambient air. This is an important advantage as the environmental temperatures are invariably uncontrollable. Hence, it becomes necessary to configure the leverage system to work within these parameters.

First sub-chamber 111a acts as an evaporator and third sub-chamber 113a acts as a condenser. Again, the three interconnected chambers may be placed at different locations. First chamber 111 may be placed inside the space to be cooled, second chamber 112 may be placed in the attic, and third chamber 113 may be place outside. The forces exerted by the actions of the ammonia vapors on piston 121 and piston 122 are transferred between the two pistons by hydraulic pressure hose(s) 151 and the ammonia is transferred among the various chambers by tubing 191.

Each of the three chambers will tend to reach equilibrium with one another, as changes in temperature occur. Either by the process of boiling or condensing, each chamber will strive to maintain vapor pressures corresponding to their respective temperatures and saturation levels. The boiling and condensing of the refrigerant creates a pushing and pulling force on the pistons and drives the system forward.

The specific volume of the ammonia vapors in first sub-chamber 111a is 0.2056 cubic meter/kg and the specific volume of vapor in second chamber 112 is 0.0635 cubic meter/kg. The specific volume of vapor from sub-chamber 111-a to second chamber 112 is decreased by a factor of (0.2056/0.0635) or 3.227. This is equivalent to saying that the density of the ammonia vapors in second chamber 112 is 3.227 times greater than the density of the ammonia vapors in first sub-chamber 111a. The area of second piston 122 is 2.96 greater than the area of first piston 121. Therefore, second piston 122 displaces (3.227×2.96) or 9.5 times more vapor than first piston 121. The production of the required additional vapor takes place in second chamber 112. As discussed, most of the vapor production and heat absorption takes place in second chamber 112. This makes up the greatest portion of the required energy to power the system.

Fortunately, this additional energy, in the form of heat, may be derived from unwanted heat from spaces such as the attic. Higher temperatures may also be readily obtained by utilizing heating devices such as solar panels and parabolic mirrors. Solar heat collectors such as venting canal systems may also be used. Venting canals are made up of insulated panels affixed to the bottom portion of the rafters of a pitched roof. This results in a longitudinal compartment bounded by the adjacent rafters on each side and by the sheathing of the roof on the top and the insulated panels on the bottom. The longitudinal compartment or canal confines the air space below the roofline and concentrates the heat to higher temperatures. The heated air rises, within the canals, to the apex of the roof where the heat is absorbed by the boiling of the refrigerant in second chamber 112.

Second chamber 112 may be in the form of a long tube, containing refrigerant, and may be placed along the apex or ridgeline of the roof, thus, absorbing heat from the attic and/or, for example, venting canals. Hence, the boiling of the refrigerant in the tube is caused by the heat from the attic and/or the venting canals. Thus, this unwanted and abundantly available heat becomes the fuel that powers the cooling system.

There is a two-fold advantage to this process. First, the more heat is absorbed by the refrigerant in second chamber 112, the more heat is also absorbed in first chamber 111, namely its 111a first sub-chamber, and hence, more cooling occurs in the living area. This is because, the higher the temperature in second chamber 112, the greater is the pushing and "pulling" (because of the hydraulic link) effect on second piston 122 and first piston 121, respectively, exercised by the refrigerant gases from second chamber 112. This translates in expanded volume, and thus, lower pressure and lower temperature in first sub-chamber 111a, which means that more heat will be absorbed from the living area. Secondly, the heat that would normally accumulate in the attic and ultimately penetrate the living spaces of a house is diverted and absorbed by second chamber 112 of the cooling system. Consequently, this absorbed heat never has the opportunity to penetrate and heat the inside of the house.

Figure 2:
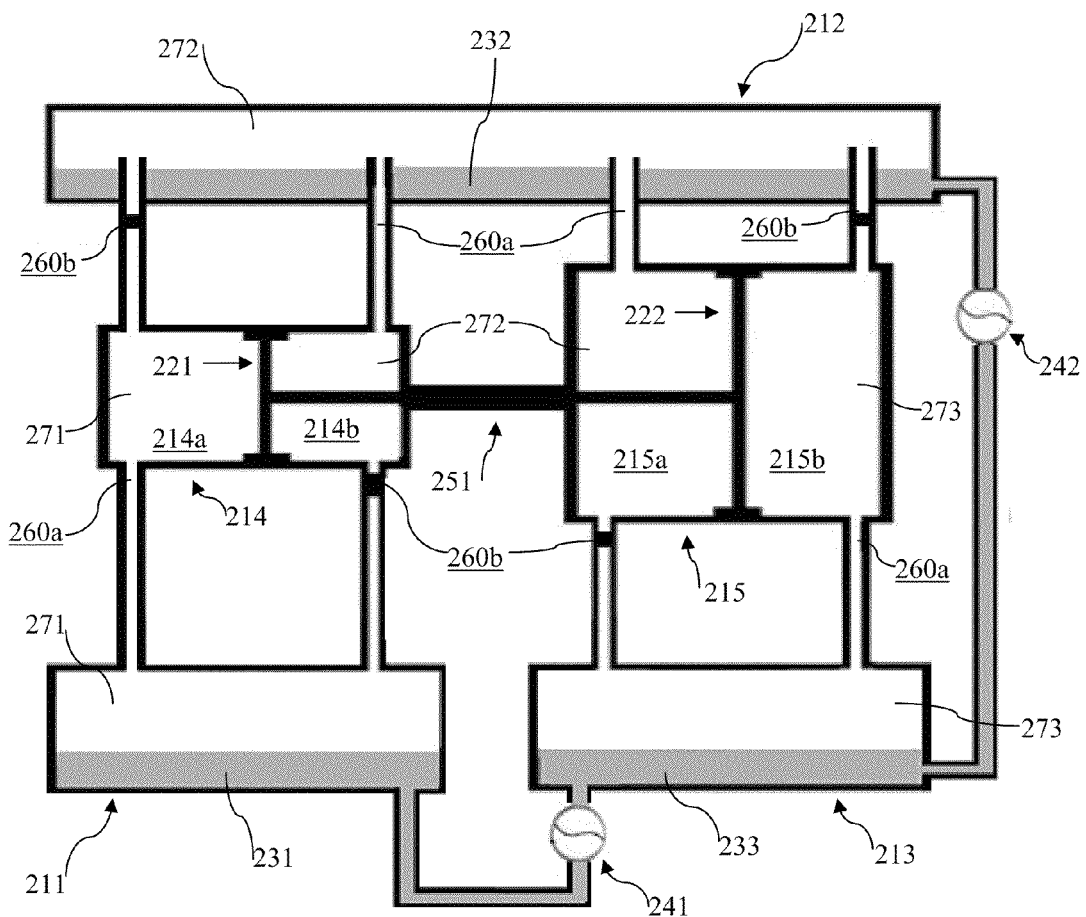
FIG. 2 illustrates a diagrammatic view of an air conditioning system, using mechanical leverage and refrigerant, according to another embodiment.

FIG. 2 illustrates a diagrammatic view of an air conditioning system, using mechanical leverage and refrigerant, according to another embodiment. The pistons and chambers from FIG. 1 are rearranged to arrive at the illustrated configuration of a pumping system that pumps vapor from first chamber 211 into second chamber 212 and ultimately into third chamber 213.

When the system is at equilibrium the parameters of temperature and pressure in the three chambers are maintained and stabilized as earlier described (first chamber 211 contains liquid ammonia 231 and ammonia vapor 271 at a pressure of 6.15 bars (P1) and a temperature of 50 degrees F.; second chamber 212 contains liquid ammonia 232 and ammonia vapor 272 at a pressure of 20.33 bars (P2) and a temperature of 122 degrees F.; third chamber 213 contains liquid ammonia 233 and ammonia vapor 273 at a pressure of 15.54 bars (P3) and a temperature of 104 degrees F.). However, the equilibrium state of the chambers become disturbed as the refrigerant boils in chambers 211 and 212 and condenses in chamber 213. The resultant change of vapor pressure in the chambers pumps the vapor through the system.

Pistons 221 and 222 are adjoined and move together as a unit, pushing the vapor through the system. The connector 251 between the two pistons 221, 222 may be a hydraulic system or link, which may comprise hydraulic member(s), such as a hydraulic piston, and hydraulic hose(s). When the four valves 260a are open and the four valves 260b are closed, as shown in FIG. 2, the two pistons move towards the right. It should be noted that, when the four valves 260a are open and the four valves 260b are closed, the pressure (P1) and the temperature of the refrigerant vapor 271 are the same in the left side 214a (i.e., first sub-chamber) of first cylinder 214 as in first chamber 211; the pressure (P2) and the temperature of the vapor 272 are also the same in the right side 214b (i.e., second sub-chamber) of first cylinder 214, and the left side 215a (i.e., third sub-chamber) of second cylinder 215, as in second chamber 212; finally, the pressure (P3) and the temperature of the vapor 273 are the same in the right side 215b (i.e., fourth sub-chamber) of second cylinder 215 as in third chamber 213. It should be understood that the horizontal configuration of the two pistons in FIG. 2 (and in the subsequent figures), and thus, the associated nomenclature (left side, right side, etc) are used for illustration purposes only. Other configurations may be used (e.g. vertical or inclined configurations) without departing from the scope of the invention.

Figure 3:
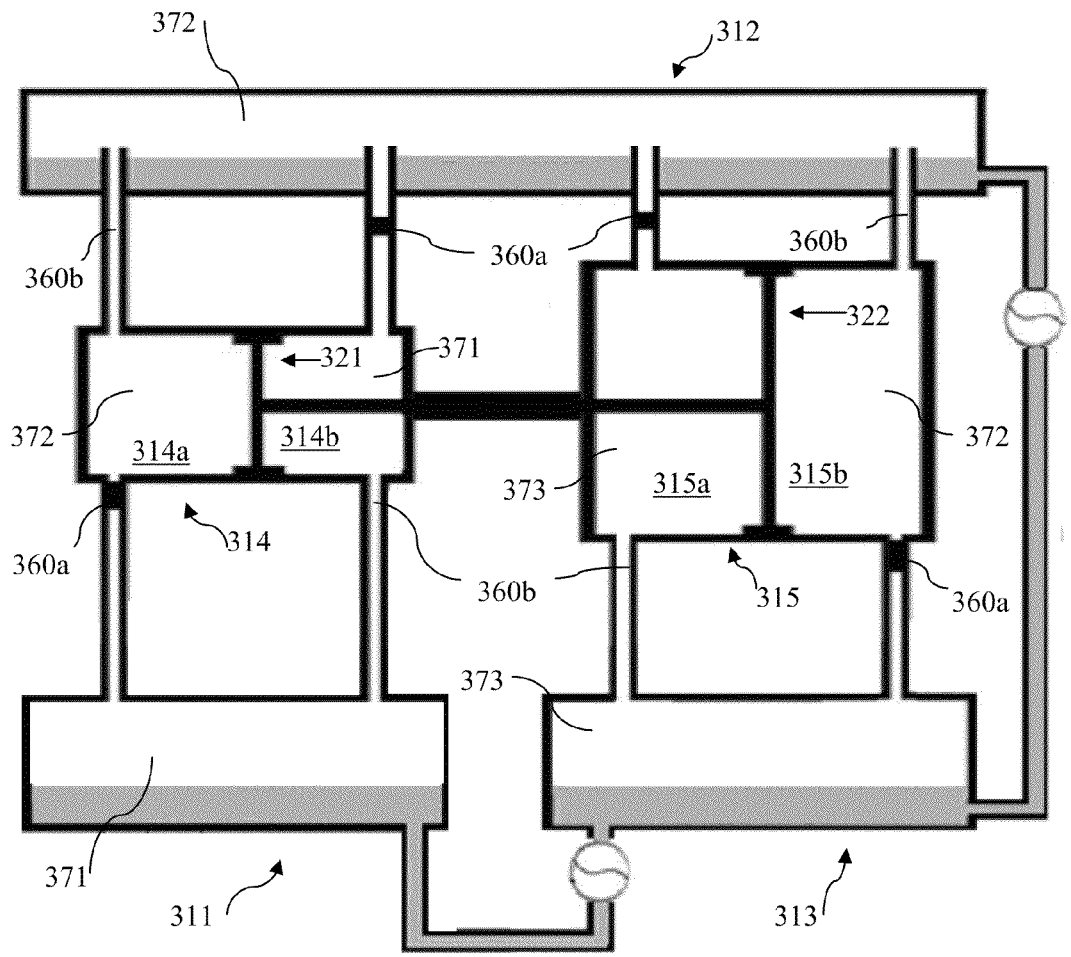
FIG. 3 illustrates a diagrammatic view of the same air conditioning system, using mechanical leverage and refrigerant, as in FIG. 2, except that, the valves that are closed in FIG. 2 are open in FIG. 3, and vice versa.

When the two pistons 221, 222 reach their end point to the right in the respective cylinders 214, 215, an electronic or a mechanical switch for example, close the four valves 260a and open the four valves 260b (as illustrated in FIG. 3 where the same valves are labeled as 360a and 360b, respectively). The polarity of pressure acting upon the system becomes reversed and the two pistons, 321 and 322 (FIG. 3), move to the left. The pressure (P1) and the temperature of the refrigerant vapor 371 (FIG. 3) are the same in the right side 314b (i.e., second sub-chamber) of first cylinder 314 as in first chamber 311; the pressure (P2) and the temperature of the vapor 372 are also the same in the left side 314a (i.e., first sub-chamber) of first cylinder 314, and the right side 315b (i.e., fourth sub-chamber) of second cylinder 315, as in second chamber 312; finally, the pressure (P3) and the temperature of the vapor 373 are the same in the left side 315a (i.e., third sub-chamber) of second cylinder 315 as in third chamber 313.

The cycle repeats when the polarity of pressure reverses again, when the pistons 321, 322 reach the end point to the left. The vapor flows continuously through the system as pistons 321 and 322 oscillate back and forth.

The condensed ammonia liquid in third chamber 213 must be recycled to first chamber 211 and second chamber 212 in proportion to their original amounts. Input of work is required at turbine 242 to pump ammonia liquid from third chamber 213 into second chamber 212, against a pressure difference of 4.79 bars (P2−P3). However, work is gained at turbine 241 as 9.39 bars (P3−P1) of ammonia liquid pressure is released from third chamber 213 into first chamber 211. A counter resistance of 9.39 bars at turbine 241 is necessary to keep the system in equilibrium.

It should be noted that the volume of chambers 211, 212 and 213 are substantially larger than the volume of cylinders 214, 215 so as to create minimal change in pressure in chambers 211, 212 and 213 as the ammonia vapor ingresses and egresses via the opening of valves 260a and 260b.

If the volume displaced by each stroke of piston 221 equals 1 cubic meter then the volume of each stroke displaced by piston 222 is 2.97 cubic meters. This is because, as it was explained earlier when describing FIG. 1, the surface area of piston 222 is 2.97 times the surface area of piston 221 in order to achieve equilibrium at the given temperature and pressure levels. In addition, as also explained earlier, because of the manner in which pistons 221, 222 are connected to each other, they travel the same distances.

As stated earlier, the specific volume of the ammonia in chamber 211 is 0.2056 cubic meter/kg, which means that its density is 4.86 kg/cubic meter. In chamber 212 the specific volume of the ammonia is 0.0635 cubic meter/kg, which means that its density is 15.74 kg/cubic meter.

From the above, it can be deducted that, with each stroke of 1 cubic meter, the amount of ammonia vapor displaced by first piston 221 is 4.86 kg. In the same time, the amount of ammonia vapor displaced by piston 222 is 46.59 Kg (15.74 kg/cubic meter×2.96 cubic meters). Thus, the ratio of ammonia to be recycled back into chamber 211 and chamber 212 is 4.86/46.59 or 1:9.5, respectively.

The work required to return the liquid ammonia to the respective chambers is a function of its density or volume and the pressure difference of the respective chambers (the specific volume of liquid ammonia is 0.0015 cubic meter/kg):

Work=V(P1−P2)

Work Gain (4.86 kg moved from chamber 213 to chamber 211):

Work 1=4.86 kg (0.0015 cubic meter/kg) (6.15-15.54) bars, or

Work 1=4.86 kg. (0.0015 cubic meter/kg) (−9.39) bars, or

Work 1=−0.0684 cubic meter×bar

Since one part of liquid ammonia (i.e., 4.96 kg) is returned to chamber 211, the difference of 41.73 kg (i.e., 46.59 kg−4.86 kg) is returned to chamber 212.

Work Expended (41.73 kg moved from chamber 213 to chamber 212)

Work 2=41.73 kg.(0.0015 cubic meter/kg) (20.33-15.54) bars, or

Work 2=41.73 kg.(0015 cubic meter/kg) (4.79)bars, or

Work 2=0.2998 cubic meter×bar

Net Work Expended=(0.2998−0.0684)=0.231 cubic meter×bar

Conventional Air Conditioning

The conventional method of air conditioning does not utilize second chamber 212 but does require the equivalence of pumping ammonia in the form of vapor from first chamber 211 to third chamber 213. The conventional method does not use a mechanical leverage advantage system. The work required in pumping 1 cubic meter or 4.86 kg of ammonia vapor from chamber 211 to chamber 213 may be determined as follows:

Work=V(P2−P1)

Volume of 4.86 Kg of ammonia vapor in chamber 211=1 cubic meter

Pressure of ammonia vapor in chamber 211=6.15 bars

Pressure of ammonia vapor in chamber 213=15.54 bars

W=1 cubic meter×(15.54−6.15) bars=1 cubic meter×9.39 bars=9.39 cubic meter×bar

Comparison Using Mechanical Advantage Versus Conventional Method

The work required for pumping a given quantity of ammonia (NH3) from one pressure to another is directly related to its specific volume as described earlier. Therefore, comparatively speaking, the work required for pumping a certain quantity of NH3 in the form of a gas is significantly greater than pumping the same quantity of NH3 in the form of a liquid.

The work required for pumping 1 Cubic Meter of NH3 vapor from chamber 211 to chamber 213 using the conventional method is 9.39 Cubic Meter×bar as determined above. The conventional method requires pumping NH3 in the form of a vapor. The NH3 vapor, having a much higher specific volume than that of NH3 liquid, requires significantly much more energy.

In the mechanical advantage system, the work of pumping the vapor from chamber 211 to chamber 212, and ultimately condensing it in chamber 213, is achieved by the boiling of liquid NH3 in chambers 211 and 212 and the condensing of NH3 vapor in chamber 213. Although work is necessary to return NH3 in the form of a liquid back into chamber 211 and 212, the advantage is that liquid NH3, having a much lower specific volume, requires less work than pumping NH3 vapor. As determined earlier, the conventional method of pumping ammonia vapor requires 9.39 Cubic Meter×Bar of work per one kilogram of ammonia, while the mechanical leverage advantage method requires only 0.231 Cubic Meter×Bar for the return of the liquid ammonia to its original state. It follows that, the mechanical advantage system requires 40.64 times (9.39/0.231=40.64) less energy than the conventional method. That's a very significant energy saving advantage.

Figure 4:
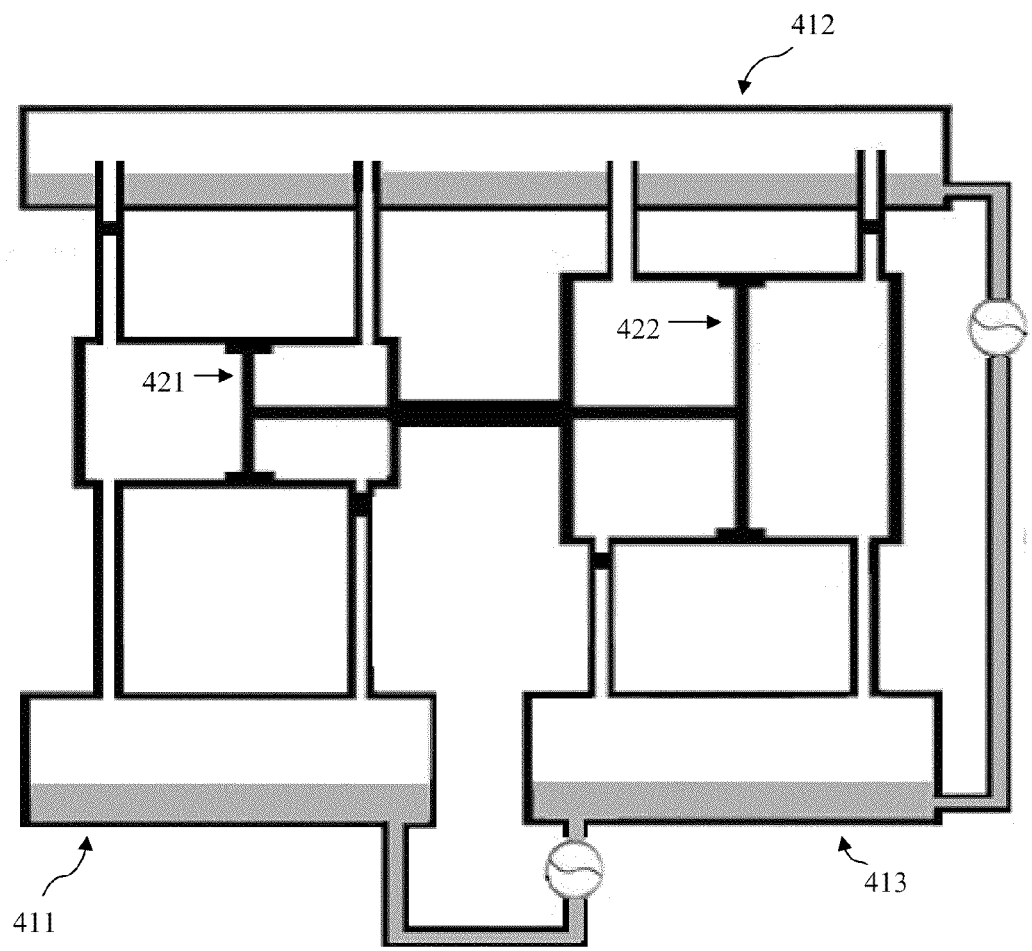
FIG. 4 illustrates a diagrammatic view of an air conditioning system, using mechanical leverage and refrigerant, according to another embodiment. The elements of the system are the same as those of the system depicted in FIG. 2, except that the temperature and the pressure in second chamber 412 are smaller, while the area of second piston 422 is greater.

Decreasing the Temperature Difference Between Second Chamber and Third Chamber by Increasing the Area of Second Piston Relative to First Piston FIG. 4 illustrates a diagrammatic view of an air conditioning system, using mechanical leverage and refrigerant, according to another embodiment. The elements of the system in FIG. 4 are the same as those of the system depicted in FIG. 2, except that the temperature and the pressure in second chamber 412 are smaller, while the area of second piston 422 is greater.

By increasing the area of second piston 422 relative to first piston 421, the pressure difference between second chamber 412 and third chamber 413 may be decreased. Consequently, there is a decreased temperature difference between the points at which the NH3 refrigerant boils in chamber 412 and condenses in chamber 413. This is a valuable concept, in that it also lowers the temperature at which the NH3 refrigerant will boil in chamber 412. This is especially valuable on days with diminished sunlight and when the temperature of the attic is not sufficient to power the system.

For exemplification purposes, let's assume that the area of second piston 422 is increased to be 6 times greater than the area of first piston 421. This means that the area of second piston 422 in FIG. 4 is approximately double relative to second piston 222 in FIG. 2. Using similar pressure parameters for first chamber 411 and third chamber 413 as those listed earlier for the system in FIG. 2, the value of the pressure (P2) in the second chamber 412 may be determined from the following equations:

$$(P2-P1) \times A1 < (P2-P3) \times A2$$

If A1=1 unit, A2=6 units; then,
(P2−6.15) bar=(P2−15.54)bar×6; it results that,
P2=17.41 bars.

At a pressure of 17.41 bars, the boiling point of NH3 in second chamber 412 is approximately 112 degrees F. Thus, the increased (i.e., double) area of piston 422 lowered the required temperature of second chamber 412 from 122 degrees F. to 112 degrees F. This means that at this considerably lower attic temperature, the system still remains functional.

During hot and sunny days, the temperature of the attic of a house would normally reach 122 degrees F. However, second chamber 412, at this temperature level, absorbs heat from the attic at a more rapid rate and will maintain the attic cooler, closer to the range of 112 degrees F., and cooler attic spaces translate to cooler living spaces. Additionally, the excess heat in the attic may be converted into energy as discussed in the following section.

Energy Surplus by Increasing A2/A1 Ratio

The parameters of the system can be changed to make the system run without any input of energy or even to create a surplus of energy. The change in parameters that would produce a surplus of energy is that which makes F2, the force acting on second piston 422, larger than F1, the force acting on first piston 421. This may be achieved by, for example, increasing the pressure/temperature of chamber 412 or increasing the surface area of piston 422 with respect to piston 421. This conclusion may be deducted from the following formulas:

Force 1<Force 2, or $$(P2-P1) \times A1 < (P2-P3) \times A2$$

For example, if starting with the same parameters for the system in FIG. 4, as described earlier, the temperature (112 F) in second chamber 412 may be allowed to reach 122 degrees F. and the pressure 20.33 bars (from 17.41 bars). This may be achieved by locking piston 422 and releasing it when the pressure builds up to 20.33 bar.

If, for example, A1 is 1 square inch and the area A2 is increased to 6 times A1, it follows that:
(20.33−6.15) Bar×1 sq. inches<(20.33−15.54) Bar (6 sq. inches), or
14.18 Bar (sq. inches)<4.79 Bar (6 sq. inches), or
14.18 Bar (sq. inches)<28.74 Bar (sq. inches);

Because with each stroke both pistons 421 and 422 travel the same distance (e.g., 1 foot or 12 inches), then:
Work 1=14.18 Bar(12 inches) and Work 2=28.74 Bar(12 inches), or
Work 1=170.16 Bar×Cubic inches, and Work 2=344.88 Bar×Cubic inches From the above, it may be deducted that, for example, by increasing the surface area of piston 422 from 2.97 square inches to 6 square inches, a work surplus of 174.72 (344.88−170.16) Bar×Cubic inches is obtained. This work surplus may be used to generate electricity by coupling the system to a generator.

One of ordinary skills in the art would recognize that the system may be configured to have a fixed (i.e., unchangeable) ratio or a flexible (i.e., changeable) ratio between the areas of second piston 422 and first piston 421 or between the work they perform. When the system is configured with a fixed ratio, it may be preferred to use from the start an "oversized" system having a relatively larger ratio than the ratio determined as needed for the system to be functional, given the estimated ambient temperature for second chamber 412 (e.g., attic temperature). By doing so, it may be ensured that the system will still function should the ambient temperature drop below the estimated level. Furthermore, as explained earlier, during hot days, an "oversized" system may convert any work surplus in electricity.

The system may also be configured to have the flexibility to adjust the ratio as needed in order to make the system still functional during a drop in the ambient temperature or to make the system generate electricity. In one example, this may be achieved by using a variable gear link between first piston 421 and second piston 422 in order to change the distance traveled by, for example, second piston 422, and therefore, the volume of vapor displaced per stroke by pistons 421, 422, and hence, the ratio between the work performed by the two pistons. In another example, a cluster of a plurality (i.e., two or more) of first pistons and/or second (i.e., larger) pistons may be used, with the system being capable to engage and disengage pistons as necessary, to achieve the desired ratio at given temperature/pressure levels.

Disengagement of First Chamber to Generate Electricity

If the temperature in the living area is adequate, the cooling portion of the system may be disengaged by bypassing first chamber (e.g., 211 or 411), thus making the system work solely to generate electricity.

Figure 5:
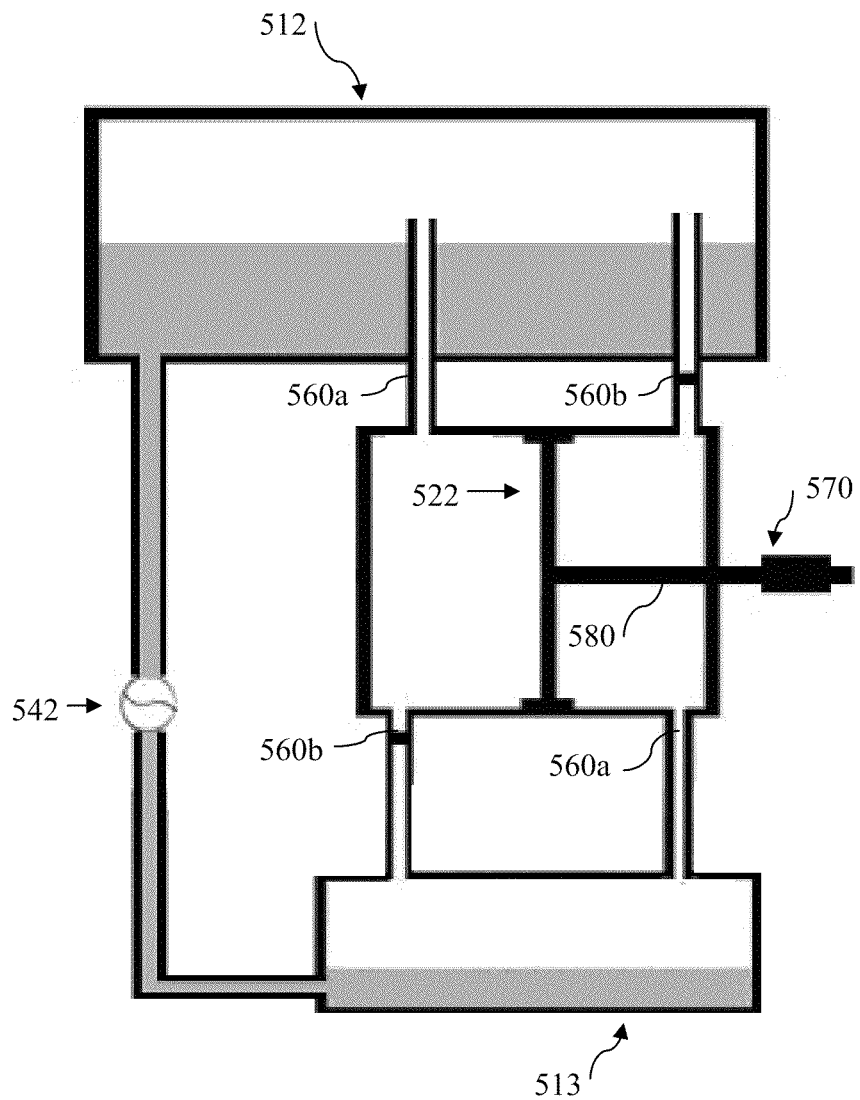
FIG. 5 illustrates a diagrammatic view of a system as in FIG. 2 without first chamber, first piston, and their respective refrigerant returns, according to another embodiment.

FIG. 5 illustrates a diagrammatic view of a system as in FIG. 2 without first chamber, first piston, and their respective refrigerant returns, according to another embodiment. For exemplification purposes, as in FIG. 2, ammonia is used as refrigerant, which has the same parameters in second chamber 512 as in 212 and in third chamber 513 as in 213. First chamber 211 (not shown in FIG. 5) is disengaged and the NH3 liquid return to it is turned off. The NH3 liquid return to second chamber 512 from third chamber 513, including the pump 542, remains intact. To summarize, first chamber (not shown in FIG. 5) is disengaged, second chamber 512 contains ammonia at a pressure of 20.33 bars and a temperature of 122 degrees F., and third chamber 513 contains ammonia at a pressure of 15.54 bars and a temperature of 104 degrees F.

Let's assume that the surface area of the piston 522 is 6 square inches and each stroke of the piston 522 travels 12 inches. Then, from Work=Difference in Pressure×Volume, it results that, Work Gained is: (20.33−15.54) bars×6 sq. inches×12 inches, or 4.79 bars (72 cubic inches), or 344.88 bar×cubic inches From the formula, Force=(P1−P2)×A, the force exerted on piston 522 may be calculated as follows:

$F=(20.33-15.54) bars \times 6$ sq. inches, or $F=4.79 bars \times 6$ sq. inches, or $F=14.6$ psi/bar$\times 4.79$ bars$\times(6$ sq. inches), or $F=419.6$ lbs.

An electrical generator apparatus 570 may be connected to the shaft 580 of the piston 522 to captures the mechanical energy produced by the system and convert it in electrical energy. The generator apparatus 570 may be in the form of a coil encasing the shaft 580 of the piston 522 while the encased portion of the shaft 580 may be compared to a magnet for inducing magnetic flux as the shaft oscillates back and forth (i.e., left and right in FIG. 5).

Figure 6:
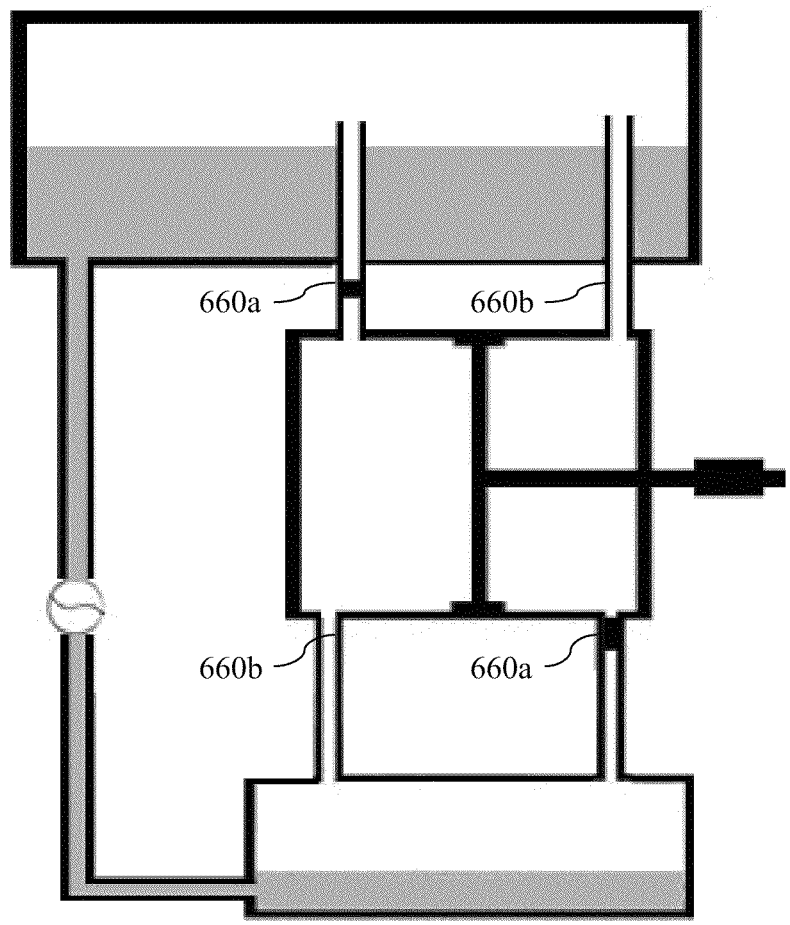
FIG. 6 illustrates a diagrammatic view of the same system as in FIG. 5, except that, the valves that are closed in FIG. 5 are open in FIG. 6, and vice versa.

As shown in FIG. 5, the system starts with valves 560a open and valves 560b closed. When the piston 522 reaches its end point to the right, a device, such as an electronic or mechanical switch, closes valves 560a and open valves 560b. The polarity of pressure acting upon the piston 522 becomes reversed and the piston 522 will move in the opposite direction. This is depicted in FIG. 6 where valves 660a are closed and valves 660b are open.

One of ordinary skills in the art would recognize that a system may be built to completely miss first chamber and first piston, to be used, as described above, solely for the purpose of generating useful work and/or electricity. Such a system would not depart from the scope of the present invention.

Use of Augmenting External Energy

To compensate for the lower than adequate ambient heat available to second chamber 712, in addition to increasing the surface area ratio of second piston 722 relative to first piston 721, as earlier described, external augmenting energy may be used, as described below. The two solutions may be used separately or in combination.

Figure 7:
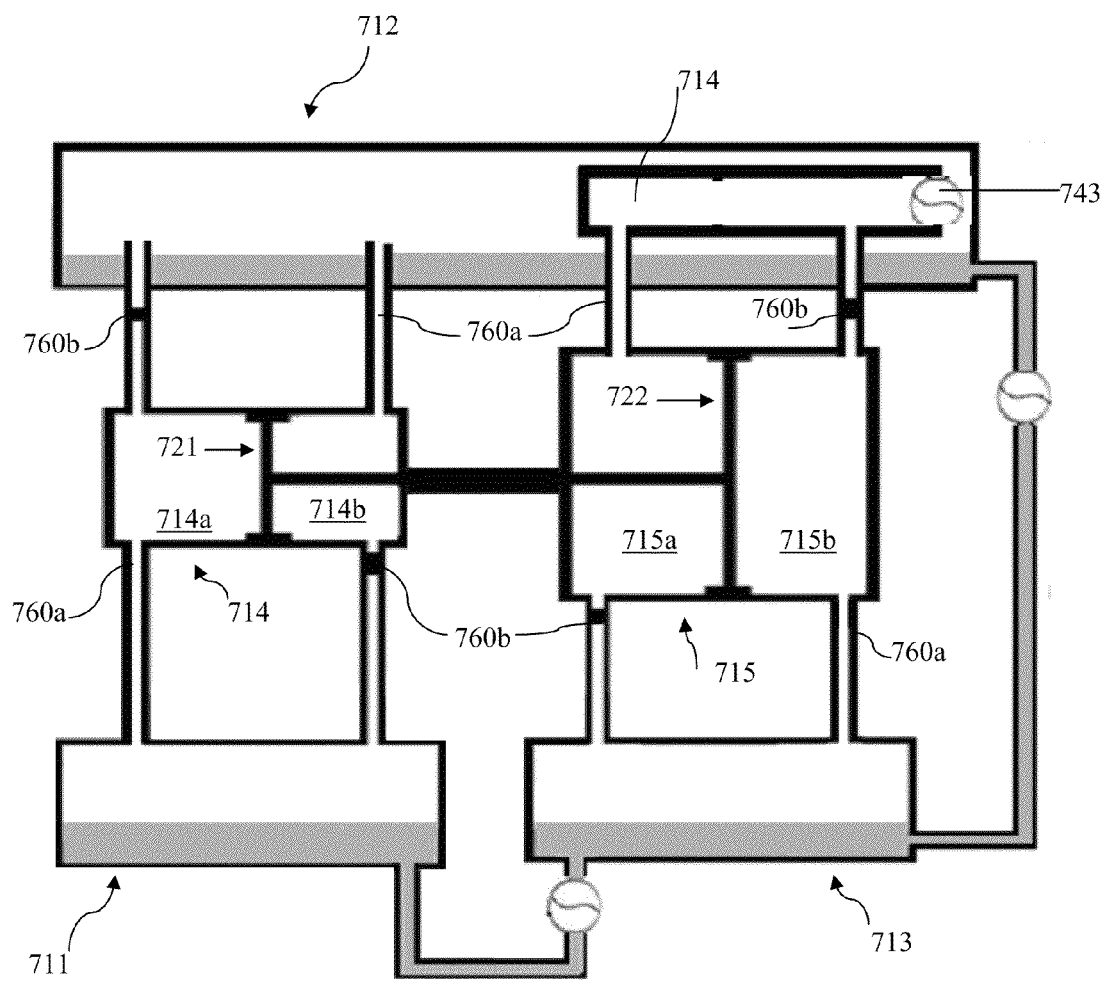
FIG. 7 depicts the same system as in FIG. 2, except that a fourth chamber and an extra pump were added.

In FIG. 7, the depicted system is the same as in FIG. 2, except that a fourth chamber 714 and a pump 743, such as a compressor, were added. In the event that ambient and/or solar energy is not sufficient to raise the temperature of the ammonia vapor in second chamber 712 to the desired level of 122 degrees F. (see description of FIG. 1 and FIG. 2 systems above), external energy may be applied to compress and boost the pressure of the ammonia vapor and consequently increase its temperature to 122 degrees F. or any other level predetermined as optimum for allowing the system to function properly.

Let's assume that, while all other parameters are the same as in FIG. 2, the temperature of second chamber 712 only reaches 111 degrees F. At this level the temperature differential would not be sufficient to allow the system to work properly. To overcome the deficiency, a compressor 743 may be used to increase the pressure of the vapor from second chamber 712 to a higher level in the fourth chamber 714, in order for the system to remain in equilibrium and to maintain the temperature of third chamber 713 at 104 degrees F. and the pressure at 15.54 bars. So, the compressor 743 may take ammonia vapors from second chamber 712 and pump it into the fourth chamber 714 until the pressure, and consequently the temperature, of the ammonia gas arrive at the desired levels.

One of ordinary skills in the art would recognize that forth chamber 714 may be eliminated from the system's configuration without departing from the scope of the invention. The compressor 743 may be configured to alternately pump ammonia vapor from second chamber 712 directly into left side 715a (i.e., third sub-chamber) and right side 715b (i.e., fourth sub-chamber) of second cylinder 715 until the desired pressure level is achieved directly in those spaces.

It should be noted that at 111 degrees F. the pressure (P2) of the ammonia vapor in second chamber 712 is 17.34 bars. The following is the calculation for the pressure (P4) of fourth chamber 714 required to maintain the system in equilibrium and third chamber 713 unchanged at 104 degrees F. and a pressure (P3) of 15.54 bars:

(P2−P1)×A1=(P4−P3)×A2; P1 is the pressure (6.15 bars) in first chamber 711 and first sub-chamber 714a; P2 is the pressure (17.34 bars) in second sub-chamber 714b and second chamber 712; P3 is the pressure (15.54 bars) in fourth sub-chamber 715b and third chamber 713; P4 is the pressure in fourth chamber 714 and third sub-chamber 715a; A1 is the surface area of first piston 721; A2 is the surface area of second piston 722; then, If A1=1 and A2=2.96, then (17.34−6.15)=(P4−15.54)×2.96; it results that P4=19.32 bars The use of a compressor requires the input of external energy. However, the energy required is much less than that required by conventional air conditioning systems. In the mechanical leverage system, with the exception of the relatively insignificant amount of energy required to pump liquid ammonia from third chamber 713 to second chamber 712, as described earlier under FIG. 2, external energy is only required to boost the pressure of the vapor from 17.34 bars (chamber 712) to 19.32 bars (chamber 714), rather than the conventional method which requires much more pumping of vapor from 6.14 bars (from first chamber 711) to 15.54 bars into third chamber 713.

To illustrate, let's assume that the stroke for each piston for both the conventional and mechanical leverage system travels 1 meter. A rough estimate of work and comparison is as follows:

Conventional System: W=(6.14–15.54) bar×CubicMeter=9.4 bar×CubicMeter

Mechanical Leverage: W=(19.329–17.34) bar×A2×1 meter; A2 is the surface area of second piston 722 (2.96 meters, as earlier determined for this exemplary configuration of the system); then, W=1.98 (2.96) bar×CubicMeter, or W=5.86 bar×CubicMeter Ratio: 5.86/9.4=0.62, or 38% less energy than the conventional method.

Figure 9:
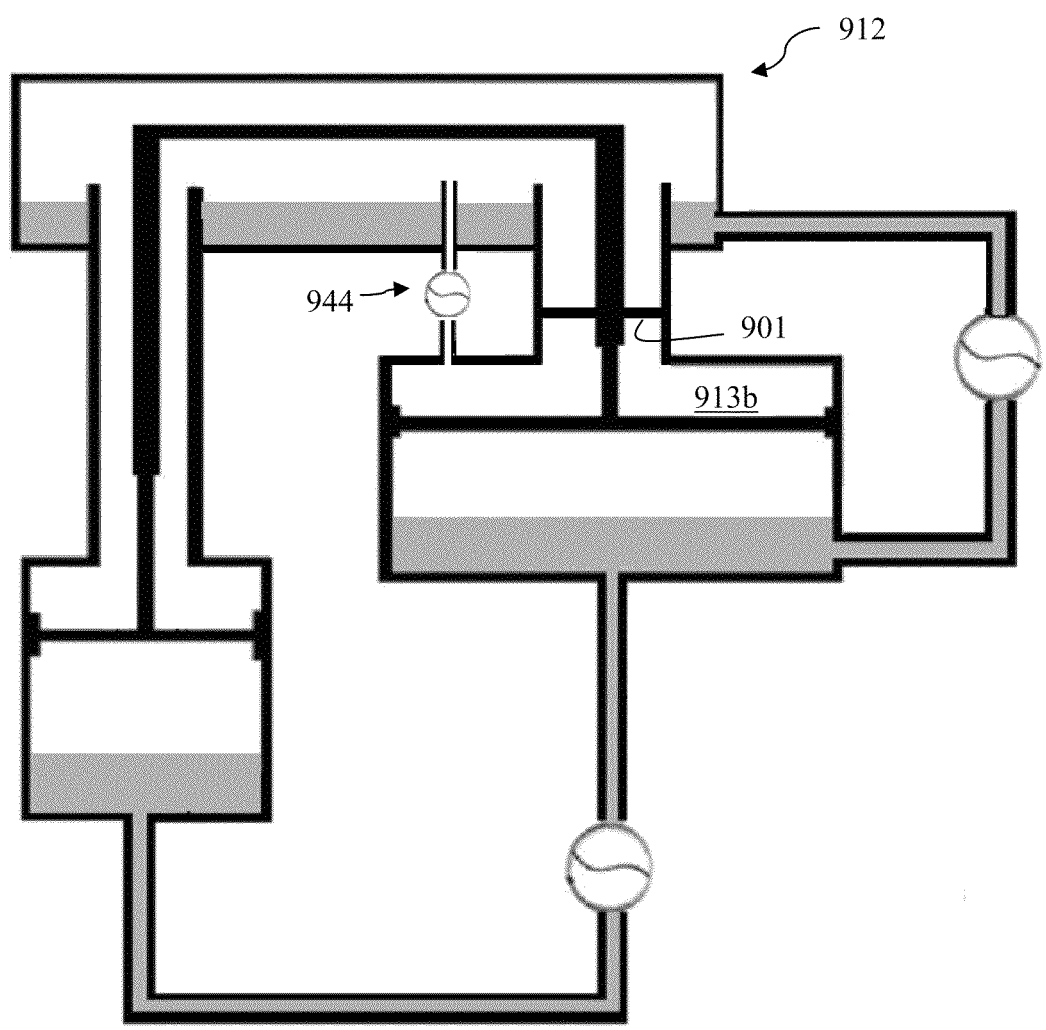
FIG. 9 depicts the same system as in FIG. 1 except that a partition and an extra pump were added.

FIG. 9 depicts an augmenting external energy system using the piston and chamber configuration similar to that of FIG. 1. However, a partition 901 is placed between second chamber 912 and sub-chamber 913b separating the two chambers having distinctive temperatures and pressures. In a similar manner, as earlier described when referring to the augmentation system from FIG. 7, the pump 944 may be used to boost the pressure of the vapor from 17.34 bars, which may be the pressure in second chamber 912, to 19.32 bars in sub-chamber 913b, which is needed, under these exemplary circumstances, in order for the system to function properly. Using the same temperature/pressure parameters of the previous example, the calculations derived using this mechanical advantage configuration, also reveals a 38% less energy consumption of that of the conventional system.

If, for example, the temperature of chamber 712 reaches 114.8 degrees F., at this temperature the pressure of NH3 vapor is 18.30 bars. Using the same calculations as above, it can be determined that the mechanical advantage system is using 52% less energy than the conventional system.

As previously described the polarity of pressure is reversed by the action of the valves. By alternating the opening and closing of valves 760a and 760b, the pistons will oscillate back and forth (i.e., left and right). Again, as earlier described under FIG. 2., when the four valves 760b are closed and the four valves 760a are open, the two pistons 721, 722 move to the right. It should be noted that during this time the pressure levels of the ammonia vapor are identical in first chamber 711 and left side 714a (i.e., first sub-chamber) of cylinder 714 (6.15 bars), in the right side 714b (i.e., second sub-chamber) of cylinder 714 and second chamber 712 (17.34 bars), in fourth chamber 714 and left side 715a (i.e., third sub-chamber) of cylinder 715 (19.32 bars), and, in the right side 715b (i.e., fourth sub-chamber) of cylinder 715 and third chamber 713 (15.54 bars).

As earlier described, when the two pistons 721, 722 reach the right end of their respective cylinders 714, 715, through, for example, an electronic or mechanical switch, the process is reversed by opening valves 760b and closing valves 760a, thus, causing the two pistons 721, 722 to move to the left. When the two pistons 721, 722 reach the left end of their respective cylinders 714, 715, valves 760b are closed and valves 760a are opened again, and the process repeats itself.

Figure 8:
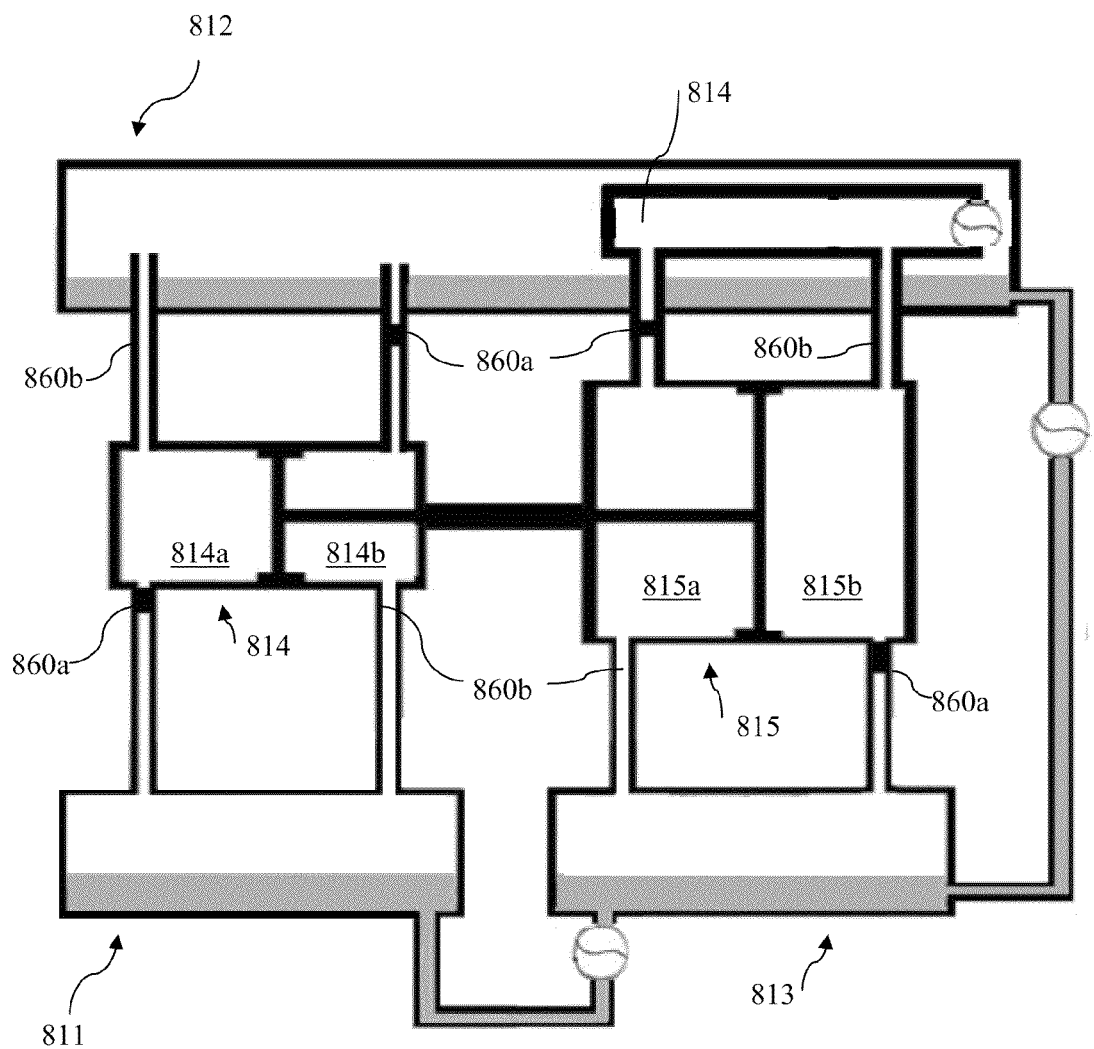
FIG. 8 depicts the same system as in FIG. 7 except that the valves that are closed in FIG. 7 are open in FIG. 8, and vice versa.

The system from FIG. 7 configured to move to the left is depicted in FIG. 8. As it can be seen, valves 860a are closed and valves 860b are open. During this time the pressure levels will balance out as follows: same pressure in first chamber 811 and right side 814b (i.e., second sub-chamber) of first cylinder 814; same pressure in the left side 814a (i.e., first sub-chamber) of first cylinder 814 and in second chamber 812; same pressure in fourth chamber 814 and right side 815b (i.e., fourth sub-chamber) of second cylinder 815; and, same pressure in the left side 815a (i.e., third sub-chamber) of second cylinder 815 and third chamber 813.

The mechanical advantage system is not limited to the use of ammonia (NH3) as the refrigerant. Other refrigerants may prove to be more effective and less expensive. Water may also be used as a refrigerant. The use of water as a refrigerant may be desirable because it has a high latent heat of vaporization and is environmentally safe. It is also inexpensive.

The pressure and the temperature levels of the refrigerant, as well as the values of other measurable characteristics of the system, such as the surface area of the pistons, are given for exemplification purposes only. One of ordinary skills in the art would recognize that alteration of these levels and values may be made without departing from the scope of the invention.

The mechanical leverage system may be reversed in the winter for use as heat pump for space heating applications. It may also be adapted for pool heating, hot water applications and/or refrigeration applications.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the present invention. Therefore, the scope of this application is intended to cover alternate embodiments and/or equivalent variations of the specific embodiments illustrated and/or described herein. Hence, the scope of the present invention is defined by the accompanying claims and their equivalents. Furthermore, each and every claim is incorporated as further disclosure into the specification and the claims are embodiment(s) of the present invention.

What is claimed is:

1. A mechanical leverage system, which, in an air conditioning application, comprises a first piston and cylinder assembly and a second piston and cylinder assembly, wherein said first piston is mounted within the interior space of said first cylinder, dividing its interior space into a first sub-chamber and a second sub-chamber, and wherein said second piston is mounted within the interior space of said second cylinder dividing its interior space into a third sub-chamber and a fourth sub-chamber; wherein said first, second, third and fourth sub-chambers each contain a fluid which is initially at predetermined and distinct pressure levels; wherein said second piston is displaceable within said second cylinder and actuated by the difference in pressure between said third sub-chamber and said fourth sub-chamber; wherein said second piston is coupled to said first piston so that the mechanical energy of said second piston is transmitted to said first piston, so as to cause the said piston to be displaced within said first cylinder, and wherein the pressure difference between said first sub-chamber and said second sub-chamber is greater than the pressure difference between said third sub-chamber and said fourth sub-chamber, and wherein said second piston simultaneously displaces a greater volume of fluid than said first piston so as to create a mechanical leverage system; the system further comprising means for incorporating a first, a second and a third chamber, each containing a refrigerant fluid which is initially at predetermined and distinct pressure levels, and wherein said first chamber comprises a first evaporator for absorbing heat from its surroundings so as to generate a gas-phase from a liquid-phase of the refrigerant fluid, said second chamber comprises a second evaporator for absorbing heat from its surroundings so as to generate a gas-phase from a liquid-phase of the refrigerant fluid and said third chamber comprises a condenser for expelling heat to its surroundings so as to convert a gas-phase of the refrigerant fluid to a liquid-phase; wherein, said first cylinder is in controlled, fluid communication with said first chamber and said second chamber, and said second cylinder is in controlled fluid communication with said second chamber and said third chamber; the system further comprising means for reversing polarity of the system, permitting a first flow of the refrigerant fluid from said first chamber to said first sub-chamber, from said second sub-chamber to said second chamber, from said second chamber to said third sub-chamber, and from said forth sub-chamber to said third chamber, and, an alternate, second flow from said first chamber to said second sub-chamber, from said first sub-chamber to said second chamber, from said second chamber to said fourth sub-chamber, and from said third sub-chamber to said third chamber; and, the system further comprising a means for energy augmentation by compressing vapor from said second chamber to said fourth sub-chamber.

2. The mechanical leverage system of claim 1, wherein, the liquid-phase refrigerant fluid is delivered from said third chamber to said second chamber.

3. The mechanical leverage system of claim 1, wherein, said liquid-phase refrigerant fluid is delivered from said third chamber to said first chamber.

4. The mechanical leverage system of claim 1, wherein said first chamber is configured to absorb heat from the inside space of a building.

5. The mechanical leverage system of claim 1, wherein said second chamber is configured to absorb heat from the attic space of a building for powering the system.

6. The mechanical leverage system of claim 1, wherein said third chamber is configured to expel heat to the outside of a building.

7. The mechanical leverage system of claim 5, further comprising selectively engageable means for increasing the pressure level in said second chamber.

8. The mechanical leverage system of claim 7, wherein, the selectively engaging means for increasing the pressure level in said second chamber comprises solar energy devices.

9. The mechanical leverage system of claim 1, wherein the volume displacement of the second piston may be controllably modified.

10. The mechanical leverage system of claim 1, wherein the volume displacement of the second piston relative to the first piston may be controlled by modifying mechanical gear ratios between the second piston and the first piston.

11. A mechanical leverage system, which, in an air conditioning application, comprises a first piston and cylinder assembly and a second piston and cylinder assembly, wherein said first piston is mounted within the interior space of said first cylinder, dividing its interior space into a first sub-chamber and a second sub-chamber, and wherein said second piston is mounted within the interior space of said second cylinder dividing its interior space into a third sub-chamber and a fourth sub-chamber; wherein said first, second, third and fourth sub-chambers each contain a fluid which is initially at predetermined and distinct pressure levels; wherein said second piston is displaceable within said second cylinder and actuated by the difference in pressure between said third sub-chamber and said fourth sub-chamber; wherein said second piston is coupled to said first piston so that the mechanical energy of said second piston is transmitted to said first piston, so as to cause the said piston to be displaced within said first cylinder, and wherein the pressure difference between said first sub-chamber and said second sub-chamber is greater than the pressure difference between said third sub-chamber and said fourth sub-chamber, and wherein said second piston simultaneously displaces a greater volume of fluid than said first piston so as to create a mechanical leverage system; the system further comprising means for incorporating a first, a second and a third chamber, each containing a refrigerant fluid which is initially at predetermined and distinct pressure levels, and wherein said first chamber comprises a first evaporator for absorbing heat from its surroundings so as to generate a gas-phase from a liquid-phase of the refrigerant fluid, said second chamber comprises a second evaporator for absorbing heat from its surroundings so as to generate a gas-phase from a liquid-phase of the refrigerant fluid and said third chamber comprises a condenser for expelling heat to its surroundings so as to convert a gas-phase of the refrigerant fluid to a liquid-phase; wherein, said first cylinder is in controlled, fluid communication with said first chamber and said second chamber, and said second cylinder is in controlled fluid communication with said second chamber and said third chamber; the system further comprising means for reversing polarity of the system, permitting a first flow of the refrigerant fluid from said first chamber to said first sub-chamber, from said second sub-chamber to said second chamber, from said second chamber to said third sub-chamber, and from said fourth sub-chamber to said third chamber, and, an alternate, second flow from said first chamber to said second sub-chamber, from said first sub-chamber to said second chamber, from said second chamber to said fourth sub-chamber, and from said third sub-chamber to said third chamber; and, the system further comprising a means for energy augmentation by compressing vapor from said second chamber to said third sub-chamber.

12. The mechanical leverage system of claim 11, wherein, the liquid-phase refrigerant fluid is delivered from said third chamber to said second chamber.

13. The mechanical leverage system of claim 11, wherein, said liquid-phase refrigerant fluid is delivered from said third chamber to said first chamber.

14. The mechanical leverage system of claim 11, wherein said first chamber is configured to absorb heat from the inside space of a building.

15. The mechanical leverage system of claim 11, wherein said second chamber is configured to absorb heat from the attic space of a building for powering the system.

16. The mechanical leverage system of claim 11, wherein said third chamber is configured to expel heat to the outside of a building.

17. The mechanical leverage system of claim 15, further comprising selectively engageable means for increasing the pressure level in said second chamber.

18. The mechanical leverage system of claim 17, wherein, the selectively engaging means for increasing the pressure level in said second chamber comprises solar energy devices.

19. The mechanical leverage system of claim 11, wherein the volume displacement of the second piston may be controllably modified.

20. The mechanical leverage system of claim 11, wherein the volume displacement of the second piston relative to the first piston may be controlled by modifying mechanical gear ratios between the second piston and the first piston.

21. A mechanical leverage system comprising: a first piston and cylinder assembly and a second piston and cylinder assembly, wherein said first piston is mounted within the interior space of said first cylinder, dividing its interior space into a first sub-chamber and a second sub-chamber, and wherein said second piston is mounted within the interior space of said second cylinder dividing its interior space into a third sub-chamber and a fourth sub-chamber; the system further comprising a power system configured to absorb heat from an attic space, transforming liquid-phase refrigerant into a gas-phase, and resulting in an increase in pressure in said power system, and a condensing system configured to expel heat outside of a building, transforming gas-phase refrigerant into a liquid-phase, resulting in a decrease in pressure in said condensing system, wherein said second piston and cylinder assembly is located between and in controlled fluid communication with said power system and said condensing system, and, wherein said second piston is displaceable within said second cylinder and actuated by the difference in pressure between said third sub-chamber and said fourth sub-chamber, said difference in pressure being generated between said power system and said condensing system, wherein said second piston is coupled to said first piston so that the mechanical energy of said second piston is transmitted to said first piston, so as to cause said first piston to be displaced within said first cylinder, and wherein said second piston simultaneously displaces a greater volume of fluid than said first piston and wherein the pressure difference between said first sub-chamber and said second sub-chamber is greater than the pressure difference between said third sub-chamber and said fourth sub-chamber, so as to create a mechanical leverage system; the system further comprising control means for permitting a first flow of fluid to enter said first sub-chamber and exit said second sub-chamber, and to enter said third sub-chamber and exit said fourth sub-chamber, and means for revering polarity of the system by permitting an alternate second flow of fluid to enter said second sub-chamber and exit said first sub-chamber, and enter said fourth sub-chamber and exit said third sub-chamber, providing means for delivering liquid-phase refrigerant from said condensing system to said power system; the system further comprising a means for energy augmentation by compressing vapor from said power system to said second piston and cylinder assembly.

22. The mechanical leverage system of claim 21, wherein said first piston and cylinder assembly constitutes a compressor.

23. The mechanical leverage system of clam 22, wherein, said compressor is that of a compressor of an air conditioning system.

24. The mechanical leverage system of claim 11, further comprising selectively engageable means for increasing the pressure level in said power system.

25. The mechanical leverage system of claim 24, wherein, the selectively engaging means for increasing the pressure level in said power system comprises solar energy devices.

26. The mechanical leverage system of claim 21, wherein, in an air conditioning application, the system further comprises an evaporating system configured to absorb heat from the inside of a building so as to generate a gas-phase from a liquid-phase of said refrigerant fluid; wherein, the power system, the condensing system and the evaporating system, each contain a refrigerant fluid which is initially at predetermined and distinct pressure levels, wherein said evaporating system is in controlled fluid communication with said power system such that to provide control means for permitting a first flow of refrigerant from said evaporating system to said first sub-chamber, from said second sub-chamber to said power system, from said power system to said third sub-chamber, and, from said fourth sub-chamber to said condensing system, causing said first piston and said second piston to travel in a first direction, and means for reversing polarity of the system by permitting and an alternate second flow from said evaporating system to said second sub-chamber, from said first sub-chamber to said power system, from said power system to said fourth sub-chamber, and, from said third sub-chamber to said condensing system, thus, causing said first piston and said second piston to travel in a reverse second direction; and, the system further comprising means for delivering liquid-phase refrigerant from said condensing system to said evaporating system.

27. The mechanical leverage system of claim 21, wherein the volume displacement of the second piston may be controllably modified.

28. The mechanical leverage system of claim 21, wherein the volume displacement of the second piston relative to the first piston may be controlled by modifying mechanical gear ratios between the second piston and the first piston.

29. The mechanical leverage system of claim 21, wherein, an increase in volume displaced by the second piston relative to the first piston decreases the temperature difference at which said fluid will boil in said power system, and condense in said condensing system.

* * * * *